United States Patent [19]

Hamerla

[11] Patent Number: 4,525,800

[45] Date of Patent: Jun. 25, 1985

[54] ENHANCED RELIABILITY DATA STORAGE SYSTEM WITH SECOND MEMORY FOR PRESERVING TIME-DEPENDENT PROGRESSIVELY UPDATED DATA FROM DESTRUCTIVE TRANSIENT CONDITIONS

[75] Inventor: Donald R. Hamerla, King of Prussia, Pa.

[73] Assignee: General Electric Co., Philadelphia, Pa.

[21] Appl. No.: 269,102

[22] Filed: Jun. 1, 1981

[51] Int. Cl.³ .............................................. G06F 13/02
[52] U.S. Cl. ..................................... 364/900; 371/61; 371/66; 365/228
[58] Field of Search ... 364/200 MS File, 900 MS File; 365/228, 229, 154; 371/61, 66

[56] References Cited

U.S. PATENT DOCUMENTS

| 3,916,390 | 10/1975 | Chang et al. | 340/173 R |
|---|---|---|---|
| 4,130,892 | 12/1978 | Gunckel et al. | 365/154 |
| 4,247,913 | 1/1981 | Hiniker et al. | 365/228 |
| 4,323,987 | 4/1982 | Holtz et al. | 365/229 |
| 4,327,410 | 4/1982 | Patel et al. | 364/200 |
| 4,335,447 | 6/1982 | Jerrim | 364/900 |
| 4,413,327 | 11/1983 | Sabo et al. | 364/900 |
| 4,445,189 | 4/1984 | Hyatt | 364/600 |

Primary Examiner—Raulfe B. Zache
Assistant Examiner—A. E. Williams, Jr.
Attorney, Agent, or Firm—Allen E. Amgott

[57] ABSTRACT

A time delay memory system is used for enhancing the reliability of a data processing system or the like, wherein the critical information contents of temporary storage means are preserved from destruction by the adverse effects of an externally originated, transient condition. Critical information, which includes time-dependent critical data and a time reference, is periodically collected from a scratch pad memory and a timer respectively. The critical information is transferred to secondary storage means and remains there throughout a predetermined delay interval, substantially immune to the adverse effects of any transient condition. The delay interval exceeds the expected duration of the transient condition and its adverse effects. If the system is switched to a recovery mode by the occurrence of a transient condition, the critical data and the time reference are reloaded from the secondary storage means into the scratch pad memory and timer respectively at the end of the delay interval. The timer is synchronized and the reloaded time reference, after being updated for the known delay interval, is used to compensate the time-dependent, reloaded critical data in the scratch pad memory for its age and thus restore data integrity.

10 Claims, 9 Drawing Figures

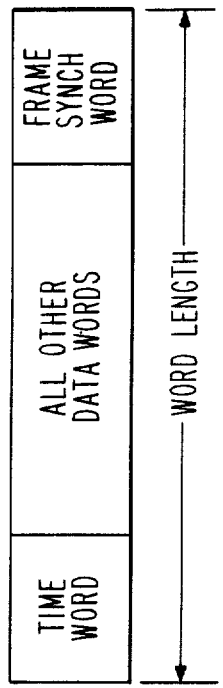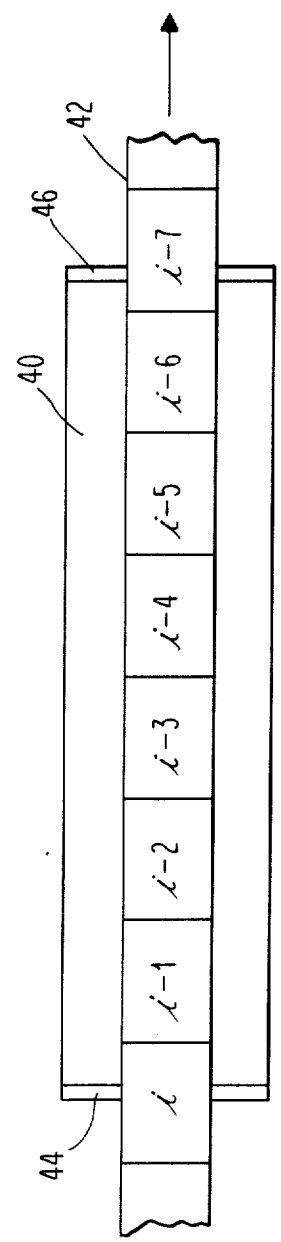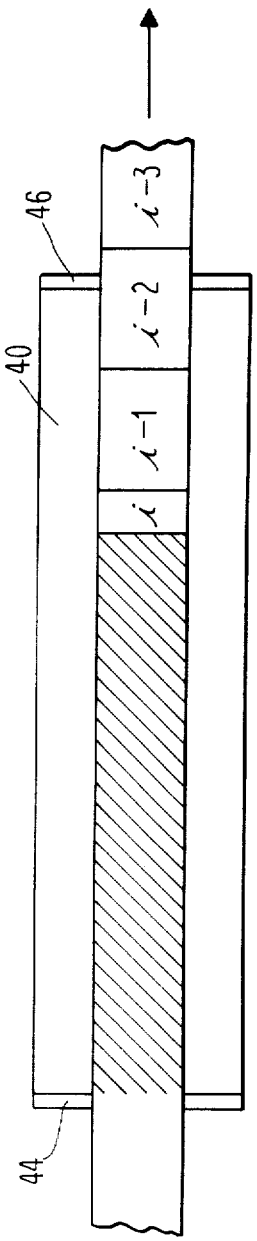
Fig. 5
Fig. 6A
Fig. 6B

ENHANCED RELIABILITY DATA STORAGE SYSTEM WITH SECOND MEMORY FOR PRESERVING TIME-DEPENDENT PROGRESSIVELY UPDATED DATA FROM DESTRUCTIVE TRANSIENT CONDITIONS

BACKGROUND OF THE INVENTION

1. Field of the Invention

The present invention relates in general to new and improved systems for preserving critical data from destruction by the adverse effects of an externally originated transient condition and in particular to apparatus and method for providing enhanced reliability of temporary data storage upon exposure to such a condition.

2. Description of the Prior Art

The advanced state of the art of miniaturization and of large scale integration permits present day electronic data processing systems and other equipment using temporary data storage to be incorporated into the machines or devices controlled by such computers. Thus, in many applications the computer, or similar equipment, is subjected to the same ambient conditions as the computer-controlled device. Some of these ambient conditions, although of a transient nature, are capable of producing adverse effects, e.g. in the form of a large power surge in the computer equipment, that may temporarily degrade the performance parameters of the equipment and/or cause temporary equipment failure through a power outage, or otherwise. While the transient condition may have a duration on the order of nanoseconds, the adverse effects may last as long as 5.5 milliseconds. These adverse effects may be directly responsible for the loss of the data in temporary storage. Such data may also be lost indirectly, if the computation process in the associated data processing system is disturbed. For example, there may be a loss of synchronization, or the time reference may be lost. Any one of these effects may impair the integrity of the computed values and may, under worst case conditions, produce failure of the data processing system.

Among the many and diverse tasks commonly performed by present day data processing systems are computations that involve time-dependent data. Any interruption or impairment of the computation process, such as may be caused by the aforesaid transient conditions, will produce errors of the calculated values.

Although integration routines to compensate for system down time have been developed, they are contingent upon the maintenance of an accurate time reference in the computer memory, generally by means of counting the output cycles of an extremely stable oscillator. The time reference serves as the basis for all other integrations and much of the data in the computer is critically dependent thereon. Accordingly, in order to preserve the integrity of such data, it is of vital importance that the integrity of the time reference be maintained throughout the disturbance, or that it be restored following the disturbance.

At the present state of the art, the optimum resolution with which time keeping can be carried out under the conditions described above, ranges from 0.1 to 5.0 msec. Thus, a significant time error may be incurred whenever a power outage, or a similar adverse effect, results from exposure of the computer to the transient condition. In all such cases the computed, time-dependent values will incur comparable errors.

When a data processing system is called on to perform tasks of the type described, time-dependent data values, such as integrals of position, velocity and acceleration which must be updated many times each second, are generally maintained in temporary storage. The temporary data storage device typically comprises a scratch pad memory having a random access capability. Data of a more permanent nature, e.g. a computer program, is normally stored in permanent data storage devices such as ROM's or the like. While the latter storage devices can be adapted by the use of state-of-the-art techniques to withstand the adverse effects of the aforesaid transient condition, temporary data storage devices are, by their nature, more susceptible to a temporary malfunction brought about by these effects. Attempts to lessen their vulnerability to such conditions have met with many difficulties.

For example, random access plated wire memories have achieved a relatively high degree of data retentivity. Such devices are, however, costly to manufacture because of the criticality of component and circuit parameters and because of the relatively large number of parts involved. Further, plated wire memories are subject to unwanted side effects. For example, the transient power surge that may be produced by the aforesaid transient condition may induce stray currents due to circuit imbalances. These currents will circulate in the plated wire matrix where they induce magnetic fields which may upset the memory cells. Memory upset also may occur as a result of spurious write currents caused by such stray currents, or as a result of spurious computer input signals if the data processing system is adversely affected by the transient condition. Any of these effects, when they occur, may cause the data in temporary storage to be scrambled or lost. Accordingly, a great deal of design effort has been expended in the past in an attempt to minimize or eliminate these effects. Notwithstanding these efforts, the magnitude of the problems which remain to be solved lessens the desirability of using plated wire memories at the present stage of development of the art.

A further disadvantage of plated wire memories lies in their relatively slow read and write rates. These may typically range between 0.5 and 1.0 words per msec. For many applications such data transfer rates result in intolerably slow speeds of computation which preclude the use of plated wire memories for the intended purpose.

OBJECTS OF THE INVENTION

It is a primary object of the present invention to provide a system for preserving the integrity of critical information from the adverse effects of an externally originated transient condition, wherein the disadvantages associated with prior art techniques directed to this purpose are largely eliminated.

It is another object of the present invention to provide an apparatus and method for preserving the integrity of critical information in temporary storage from impairment by the adverse effects of a transient condition arising externally thereof.

It is a further object of the present invention to provide a simple and economical, high speed time delay memory system which is capable of preserving information in temporary storage from destruction by the adverse effects of a transient condition.

It is still another object of the present invention to provide apparatus and method for use with a data processing system for preserving data in temporary storage from destruction by the adverse effects of an externally originated, transient condition, whereby ongoing computational operations can be resumed substantially without error following the interruption or disturbance thereof by the aforesaid effects.

SUMMARY OF THE INVENTION

The invention is directed to a time delay memory system, including apparatus and method adapted to operate with a data processing system, for preserving data stored in the data processing system from destruction by the adverse effects of an externally originated transient condition. Data in temporary storage, e.g. in a scratch pad random access memory, is potentially vulnerable to the adverse effects that may result from certain transient conditions. In the present invention, critical data is periodically collected from the temporary storage device, concurrently with the collection of a time reference provided by a conventional timer. For each such collection, the critical data and the time reference jointly constitute a frame of critical information, which may further include a frame synchronization word. Successive information frames are transferred to a secondary storage device and placed in a continuously advancing FIFO (first in, first out) queue where they remain throughout a predetermined delay interval, substantially immune to the aforesaid adverse effects. The delay interval (transit time through the queue) is selected to assure that at least one complete frame, collected before the onset of the transient condition, is present in the secondary storage device after the adverse effects resulting from the transient condition have subsided.

The delayed information frames are normally discarded upon exiting from the secondary storage device. However, when the system switches to a data recovery mode upon the onset of the transient condition, the delayed critical data and time reference are reloaded into the scratch pad memory and timer respectively. Reloading occurs after the adverse effects produced by the transient condition have subsided. The timer is synchronized and advanced to compensate for the known delay interval imposed by the secondary storage means. The compensated time reference determines the magnitude of the correction that is applied to the reloaded critical data to compensate it for the known delay. The critical data is thus preserved and normal data processing operations can be resumed after the aforesaid compensation steps have been completed.

These and other objects of the present invention, together with the features and advantages thereof will become apparent from the following detailed specification when considered in conjunction with the accompanying drawings in which applicable reference numerals are carried forward.

BRIEF DESCRIPTION OF THE DRAWINGS

FIG. 5 illustrates a typical frame of information;

FIGS. 6A and 6B illustrate the recovery mode of operation of the apparatus shown in FIG. 2;

DESCRIPTION OF THE PREFERRED EMBODIMENT(S)

Figure 1:
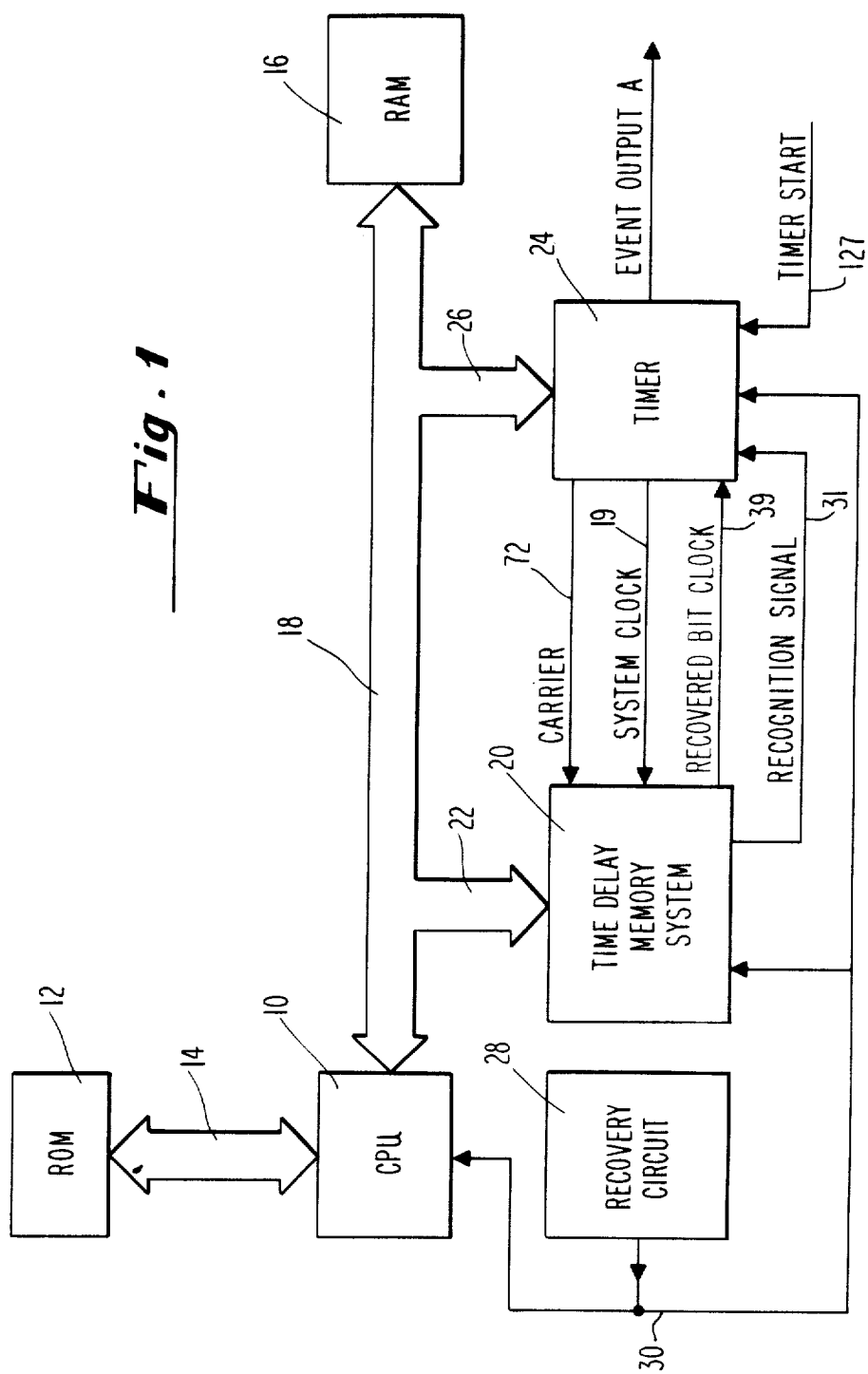
FIG. 1 illustrates a data processing system which incorporates a time delay memory system in accordance with the present invention.

With reference now to the drawings, FIG. 1 illustrates a data processing system which incorporates a time delay memory system in accordance with the present invention. A central processing unit (CPU) 10 is coupled to a read only memory (ROM) 12 by way of a bus 14, as well as to temporary storage means, such as a scratch pad random access memory (RAM) 16, by way of a system bus 18. A time delay memory system 20 is coupled to system bus 18 by way of a time delay memory bus 22. Furthermore, time delay memory system 20 is coupled to a timer 24 from which it receives a Carrier signal via a conductor 72 and a System Clock signal via a conductor 19, and to which it supplies a Recovered Bit Clock signal via a conductor 39 and a Recognition signal via a conductor 31. Timer 24 is coupled to system bus 18 by way of a timer bus 26. Furthermore, timer 24 may produce various Event signals one of which is illustrated by Event Output A. Although shown separately, timer 24 may form part of the same storage means as the scratch pad memory in an alternative embodiment of the present invention. A recovery circuit 28 is connected to provide signals to central processing unit 10, time delay memory system 20 and timer 24 via a conductor 30. Buses 14, 18, 22 and 26 are indicated as being bidirectional, each including means for transmitting and receiving data, address signals and control signals.

ROM 12 provides permanent data storage for computer programs which operate the central processing unit. RAM 16, which is preferably a conventional semiconductor scratch pad memory, provides temporary data storage for data of the type that needs to be frequently updated, such as time-dependent values. Unlike ROM 12, which can be rendered substantially immune to the adverse effects of certain types of externally generated transient conditions by using state-of-the-art techniques, the data contents of RAM 16 are potentially vulnerable to these effects.

CPU 10 and the power supplied thereto may be likewise vulnerable to the adverse effects of the externally generated transient condition. The transient condition may, for example, produce a transient power surge, or it may temporarily disable the power and thus affect the operation of the CPU directly or through spurious computer input signals resulting therefrom. The overall effect of the transient condition on the data processing system may thus be to degrade its performance or, under worst case conditions, to bring about a system failure.

Figure 2:
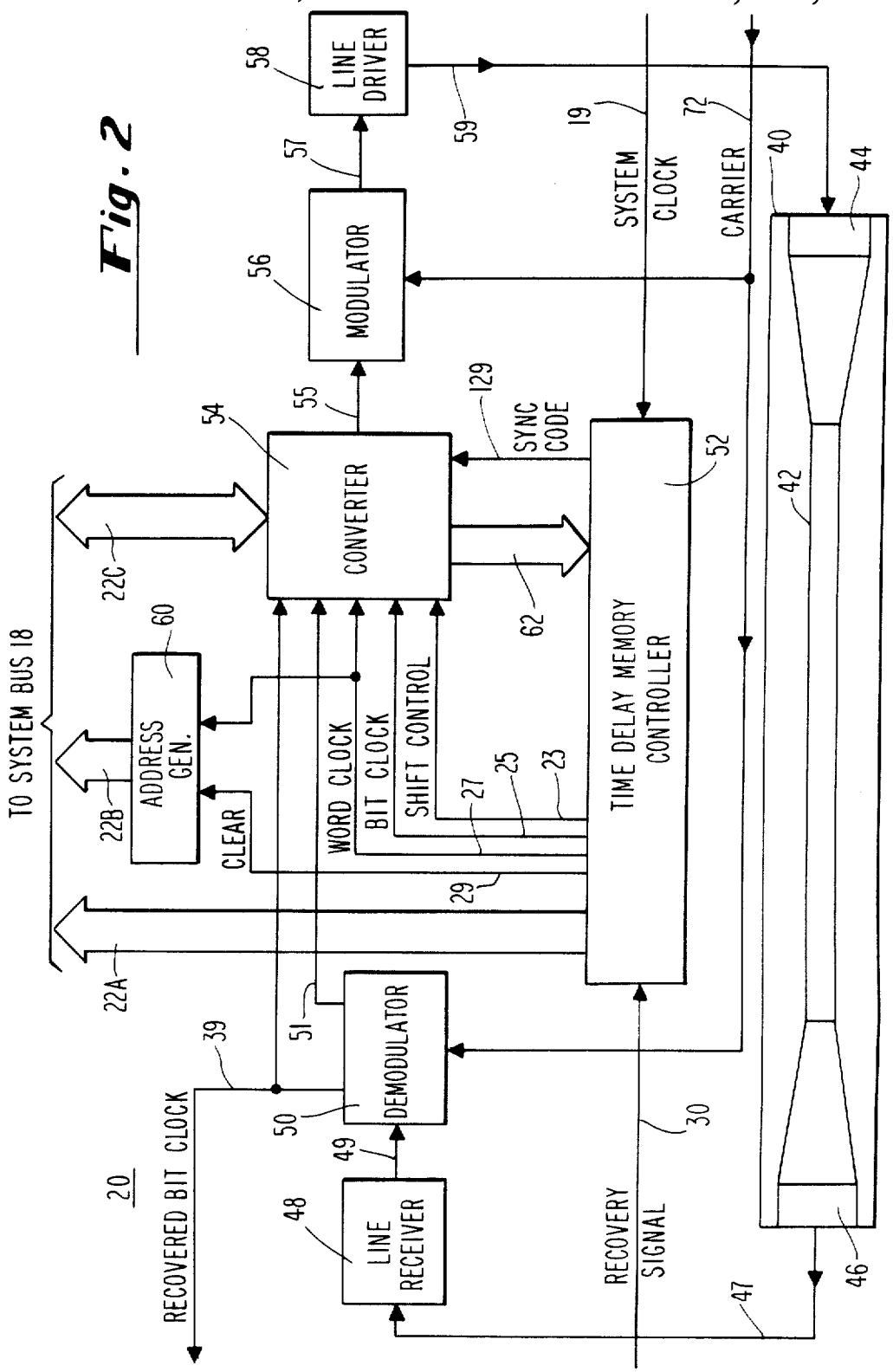
FIG. 2 illustrates a preferred embodiment of the time delay memory system of FIG. 1.

FIG. 2 illustrates a preferred embodiment of time delay memory system 20 in greater detail. A secondary storage device is provided in the form of an acoustic delay line 40 having a fused silica capillary line 42 extending between an input port 44 and and output port 46. Data is propagated through the delay line via an inner surface mode and reaches the output port at an interval dt after it is applied to the input port. A time delay memory controller 52 is connected to receive a Recovery signal from recovery circuit 28 via conductor 30 shown in FIG. 1, as well as a System Clock signal from timer 24 via conductor 19 also shown in FIG. 1. The latter signal provides System Clock pulses, which are derived as explained below in connection with the discussion of FIG. 4. Memory controller 52 provides a number of control and timing signals which are explained in greater detail in the discussion of the respective components that respond to these signals.

A conductor 47 connects output port 46 to the input of a line receiver 48, and the output from line receiver 48 is coupled via a conductor 49 to the input of a demodulator 50. Demodulator 50 also receives the carrier signal via conductor 72 from timer 24. In one embodiment of the present invention, the Carrier signal may have a frequency of 20 MHz. A converter 54, which may include a shift register capable of performing parallel-to-serial and serial-to-parallel conversion of data, has its serial input connected to the output of demodulator 50 via a conductor 51. The serial output of the converter is connected to a modulator 56 via a conductor 55, which likewise receives the aforesaid carrier signal from timer 24 via conductor 72. The output of modulator 56 is connected via a conductor 57 to a line driver 58 which, in turn, is connected via a conductor 59 to input port 44 of delay line 40.

Time delay memory bus 22, shown in FIG. 1, includes three major bus portions designated by the reference numerals 22A, 22B and 22C as shown in FIG. 2. Control signals are transmitted via bus 22A and system bus 18 from controller 52 to timer 24 or to the scratch pad memory of RAM 16. The parallel output address signals of an address generator 60 is connected via bus 22B and system bus 18 to RAM 16 and timer 24. Information is transmitted via bus 22C and system bus 18 between converter 54 and both RAM 16 and timer 24. An output bus 62 couples the parallel output of converter 54 to controller 52.

Converter 54 is connected to receive a number of control and timing signals from controller 52, specifically a Shift Control signal, a Bit Clock signal, a Word Clock signal and a Sync Code signal, which are provided via respective conductors 23, 25, 27 and 129. The Word Clock signal is further coupled to address generator 60. A Clear signal is coupled from controller 52 to address generator 60 via a conductor 29 to reset the address register.

The Shift Control signal determines whether Converter 54 is a parallel to serial or a serial to parallel converter and whether the Bit Clock or Recovered Bit Clock signal is used to time the data shifts. The Bit Clock signal provides a time reference for the data shifts within the converter, except during the period from the trailing edge of the Recovery signal to recognition of the frame synchronization word. During this interval the Recovered Bit Clock is used. The Word Clock signal provides a time reference for the release of a parallel address signal from the address generator on bus 22B and the release or acceptance of parallel data by converter 54 to or from bus 22C. The Sync Code signal controls the state of the identifier bits which are added to each word by the Converter. This signal forces all identifier bits to ONES to establish a unique frame synchronization word for each data frame.

Figure 3:
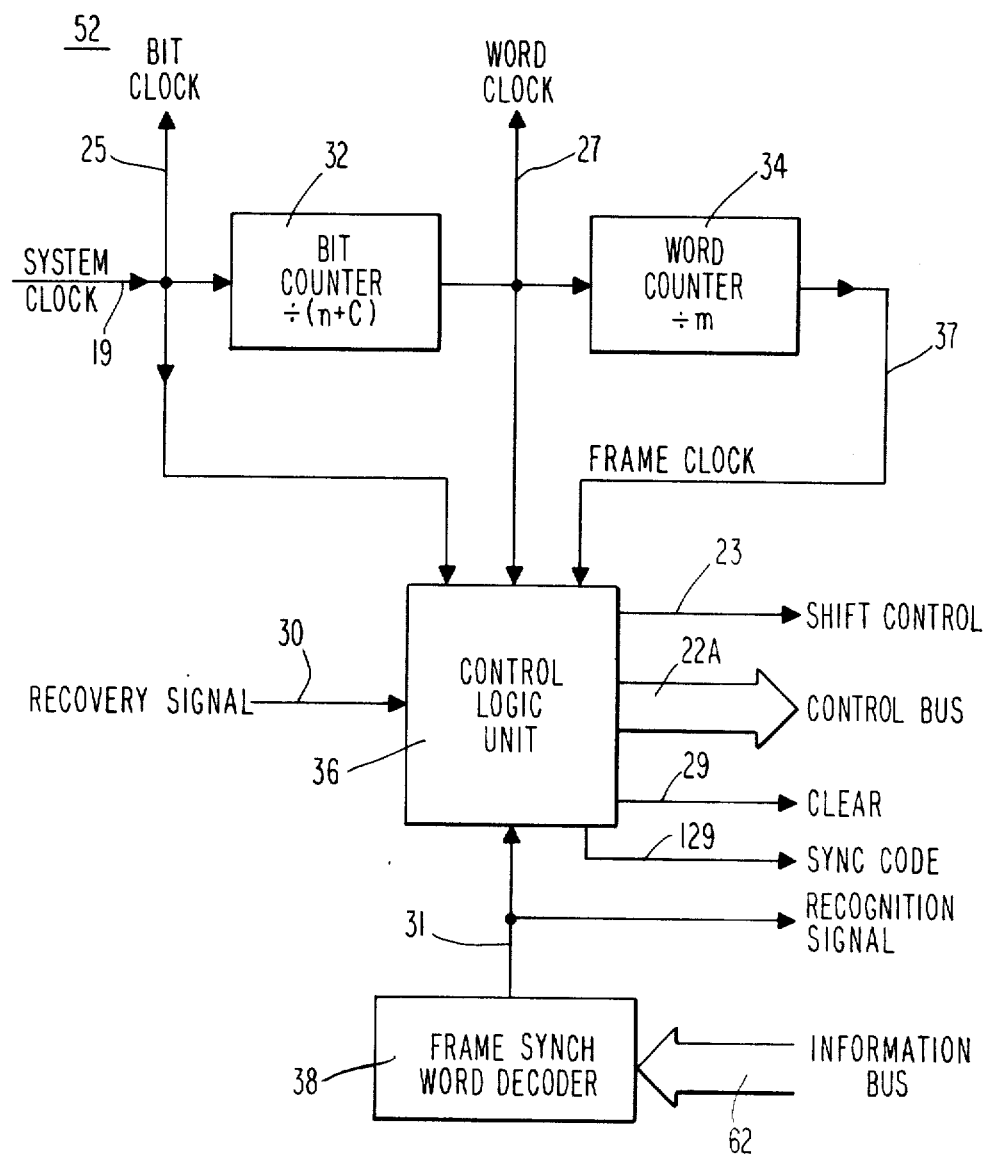
FIG. 3 is a block diagram of a preferred embodiment of the time delay controller shown in FIG. 2.

FIG. 3 is a block diagram which illustrates certain details of a preferred embodiment of time delay memory controller 52. The System Clock signal from timer 24, shown in FIG. 1, is applied to a bit counter 32 and to a control logic unit 36. In the preferred embodiment shown, the System Clock also constitutes the Bit Clock, without further scaling down the frequency of these pulses. But counter 32 is adapted to scale down the frequency of the applied clock pulses by a factor (n+c). The Word Clock signal is provided at the output of counter 32. In addition to being coupled to the units discussed in connection with FIG. 2, the Word Clock signals are further applied to control logic unit 36 and to a word counter 34. Word counter 34 is adapted to scale down the frequency of the Word Clock signal by a factor m, to thereby provide a Frame Clock signal at its output 37, which is also coupled to control logic unit 36.

The Recovery signal, which is provided from the output of recovery circuit 28 (shown in FIG. 1) via conductor 30 when a transient condition is sensed, is applied to control logic unit 36.

Converter 54 (shown in FIG. 2) is coupled via information bus 62 to a frame synchronization word decoder 38. Word decoder 38 generates the Recognition signal which is coupled via conductor 32 to unit 36 and timer 24 shown in FIG. 1. When a frame synchronization word appears on bus 62, the Recognition signal is applied to control logic unit 36 via conductor 31. Control bus 22A is connected to the output of unit 36 from which it derives control signals that are further transmitted via system bus 18, as discussed in connection with FIG. 2. Further, the Shift Control signal, the Clear signal and the Sync Code signal are generated by unit 36 and are carried by respective conductors 23, 29 and 129.

Figure 4:
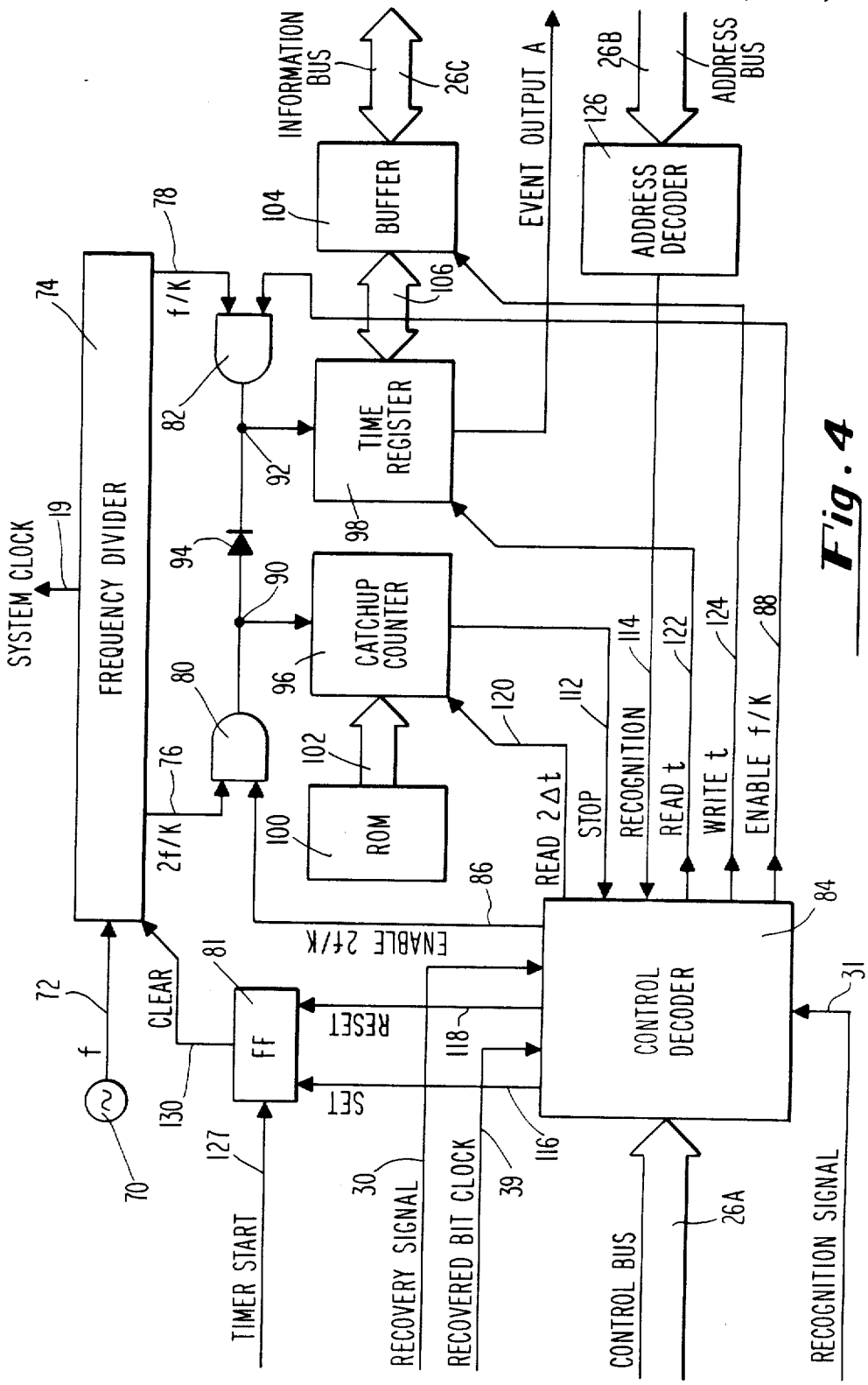
FIG. 4 illustrates the timer shown in FIG. 1 in greater detail.

Timer 24 is illustrated in detail in FIG. 4. An oscillator 70 provides a signal at the carrier frequency via conductor 72 to a frequency divider 74 and also to modulator 56 and demodulator 50 shown in FIG. 2. This carrier frequency is scaled down by a suitable factor to provide the aforesaid System Clock signal via conductor 19 from the output of frequency divider 74. In an exemplary embodiment of the invention, the carrier frequency of 20 MHz is scaled down to a frequency of 5 MHz for the System Clock signal.

Frequency divider 74 has a second output 76 from which a signal having a frequency 2f/k is derived and a third output 78 from which a signal having a frequency f/k is provided. The signal at output 76 is applied to an AND gate 80 and the signal at output 78 is coupled to an AND gate 82. Gate 80 receives an enable signal via a conductor 86 from a control decoder 84. Conductor 86 is designated Enable 2f/k. Similarly, gate 82 receives a further enable signal from control decoder 84 via a conductor 88 which is designated Enable f/k.

AND gate 80 has an output connected to a catch-up counter 96 via a conductor 90. Counter 96 has a parallel input which is connected to a read only memory (ROM) 100 by way of a bus 102. AND gate 82 has its output connected to a time register 98 via a conductor 92. The outputs of respective AND gates 80 and 82 are further coupled together via a diode 94, which is poled to conduct in the direction shown. Time register 98 preferably comprises a binary counter which is bidirectionally coupled to a buffer 104 by way of a bus 106. In accordance with the convention adopted in connection with FIG. 2 relative to bus 22, timer bus 26, which couples timer 24 to system bus 18 in FIG. 1, includes three major bus portions. In FIG. 4 these portions are designated by the reference numerals 26A, 26B and 26C and they provide control signals, address signals and information signals respectively. Buffer 104 is bidirectionally coupled to information bus 26C.

Control bus 26A is connected to apply control signals to control decoder 84 from bus 18. Decoder 84 further receives the Recovered Bit Clock signal via conductor 39 from demodulator 90 shown in FIG. 2 and the Recovery signal via conductor 30 from recovery circuit 28 shown in FIG. 1. Further, decoder 84 receives a Stop signal via a conductor 112 from the output of catch-up counter 96. In response to particular address signals applied to and recognized by an address decoder 126 by way of address bus 26B, a second Recognition signal is applied to the input of control decoder 84 via a conductor 114 from the output of address decoder 126.

Control decoder 84 is adapted to provide Set and Reset signals via a pair of conductors 116 and 118 respectively, for application to a flip flop 81. Flip flop 81 receives a Timer Start signal by way of an input line 127 and is adapted to apply a Clear signal to frequency divider 74 by way of a conductor 130 when the flip flop is in its reset state.

Decoder 84 provides designated Enable 2f/k and Enable f/k output signals which are coupled to one input of gates 80 and 82 respectively via respective conductors 86 and 88, as discussed above. Decoder 84 also provides another output signal which is designated Read 2Δt and is coupled via a conductor 120 to catch-up counter 96. Decoder unit 84 further respectively provides a Read t output signal via a conductor 122 to time register 98 and a Write t output signal via a conductor 124 to buffer 104.

Before proceeding with a discussion of the operation of the system, the operation of the timer illustrated in FIG. 4 will be described. When power is first applied, oscillator 70 provides a signal having a frequency f which is the carrier frequency for the acoustic delay line and which is reduced in frequency by frequency divider 74 to provide frequency f/k. The constant k is chosen to apply the desired least count frequency to time register 98 which, as discussed above, comprises essentially a binary counter in a preferred embodiment of the invention.

As long as the Clear signal is maintained on conductor 130 by the reset condition of flip flop 81, unit 74 is inhibited from providing an output f/k signal to AND gate 82. Flip flop 81 is set only when a Timer Start signal is applied via conductor 127, sometime after power is first turned on. Prior to the application of the Timer Start signal, however, a value representative of the desired time interval dt is loaded into time register 98 by CPU 10. The loading step forms part of the normal operation of the computer system illustrated in FIG. 1 and occurs by way of system bus 18, information bus 26C, buffer 104 and bus 106. The information thus loaded into the time register constitutes a number representative of the "time to go" interval, i.e. the time from receipt of the Timer Start signal to the time of some event required by the specific application of this invention.

The application of Timer Start signal to flip flop 81 removes the Clear signal at the output of flip flop 81. Frequency divider 74 now is uninhibited and provides a signal of frequency f/k to the input of AND gate 82. If an Enable f/k signal is present from decoder 84 via conductor 88, gate 82 provides f/k clock pulses at its output 92, which are applied to time register 98. As previously explained, the time register is essentially a binary counter and the applied clock pulses serve to count down, i.e., to decrement the count (time to go interval) residing in the register. During the interval following the timer start pulse and before dt is decremented to 0, time delay memory system 20 periodically polls the time register to determine the remaining time to go interval in the register. Specifically, time delay memory system 20 supplies the time address via address generator 60 by way of address bus 22B (both shown in FIG. 2), system bus 18, and address bus 26B. Concurrently, appropriate control signals are applied by way of control bus 22A, system bus 18 and control bus 26A.

The applied timer address signal is decoded by address decoder 126 and, if recognized, control decoder 84 is signaled by way of conductor 114. The control decoder then issues a responsive Write t signal on conductor 124, which opens buffer 104 and permits timer register 98 to provide the desired time information to information bus 26C as part of the polling procedure. At time t=0, an output pulse is provided by time register 98 which is applied to an appropriate receptor in the host system by way of Event output A. Until the count in the time register is decremented to 0, the register is not available to receive another time word. However, once the aforesaid output pulse is generated, register 98 is again available for timing an event so that a new dt time interval can be loaded in from the CPU.

The normal mode of operation described above changes to a recovery mode when a Recovery signal is applied to control decoder 84 by way of line conductor 30, in response to the onset of a transient condition sensed by recovery circuit 28 shown in FIG. 1. In the recovery mode time delay memory system 20 supplies a recovered time word to timer 24 by way of information bus 22C, system bus 18 and information bus 26C. This word is loaded into time register 98 by way of buffer 104 when the address decoder recognizes the timer address applied via bus 26B, and the control decoder recognizes associated control signals applied via bus 26A. Control decoder 84 responds to these signals by applying a responsive Read t command to the time register over conductor 122.

The application of the Recovery signal to control decocer 84 further causes the latter to apply a Reset signal to flip flop 81 so that frequency divider 74 is cleared and no further clock pulses are applied to gates 80 and 82. After Recovery signal 30 is removed (i.e. after the transient condition has subsided) and upon receipt of the Recognition signal 31 and the Recovered Bit Clock signal 39, decoder 84 generates a Set pulse on line 116 which sets flip flop 81 and removes the Clear signal at output 130 thereof. Since the frequency divider is now no longer inhibited, it once again generates clock pulses at output 78 of a frequency f/k. Further, the setting of flip flop 81 causes these clock pulses to be synchronized to a phase accuracy of 1/f with respect to the Recovered Bit Clock pulses. Moreover they are synchronized to their phasing prior to the occurrence of the transient condition to an accuracy which depends on the sonic velocity variability in, and the nominal transit time through the acoustic delay line.

The newly synchronized clock pulses at frequency divider output 78 are now available to decrement the count residing in time register 98 at the pulse frequency f/k. However, although restored to its pre-disturbance operation, the time register now lags in time by the amount of the delay Δt imposed by delay line 40. In order to compensate for this delay, the loss of the Recovery signal further causes control decoder 84 to generate an Enable 2f/k signal on output 86 and remove the Enable f/k on output 88, which disables AND gate 82 and enables AND gate 80, thus providing pulses of frequency 2f/k at gate output 90. Concurrently with the foregoing action, control decoder 84 generates a Read 2Δt signal at its output 120, which commands catch-up counter 96 to read a value equivalent to 2Δt from ROM 100 and to write it into the catch-up counter.

Since gate 82 remains disabled during this operation, the clock pulses appearing at gate output 90 are applied to catch-up counter 96, as well as to time register 98 by way of blocking diode 94. Thus, the time register begins to decrement the time word residing there at a rate twice its normal rate. The catch-up counter likewise counts down at this rate. The accelerated count down of time register 98 continues until the count in the catch-up counter is decremented to 0. At that time a Stop signal is generated by catch-up counter 96 and is applied via conductor 112 to control decoder 84. This action causes gate 80 to be disabled, while gate 82 is simultaneously enabled via line 88 to restore normal timing.

It will be understood from the foregoing discussion that, while the count residing in time register 98 (time to go interval) is always available upon demand, the time register, and thus the timer, are capable of running independently of CPU inputs. Hence, the timer is capable of providing timed events even though the CPU portion of the computer system may be shut down, e.g. as a result of the adverse effects produced by a transient condition or to conserve power during periods which do not require CPU operation.

Although a count down technique (counter decrementing) has been described, a count up scheme (counter incrementing) could also be used. The count down technique is preferred since it obviates the need for a comparator which contains the desired event time. Since the computer known the initial time word that was loaded into the time register, it can always compute actual time from time to go.

It will be clear that the invention is not limited to the double clocking scheme described and illustrated herein, which uses a frequency of 2f/k to accelerate the counting in order to compensate for age. Any multiple of f/k can be used for the purpose, up to the frequency f.

In the operation of the data processing system shown in FIG. 1, the system is arranged, e.g. by CPU programming, to place all critical data into contiguous locations of scratch pad memory 16. As used herein, the term critical data includes time-dependent values such as integrals of velocity and acceleration, preferably organized into data words of n-bits each. Time delay memory system 20 periodically collects, i.e. reads out, one or more of these critical data words from the scratch pad memory by way of system bus 18.

Timer 24 provides a time reference at the output of time register 98, which takes the form of an n-bit time word in a preferred embodiment of the invention. The time word constitutes a count which represents either the time to go to or the time elapsed from a predetermined reference point in time. As already discussed, this count is progressively updated in clock pulse synchronism by the output signals of frequency divider 74 to provide a current count of the elapsed time.

Each time when scratch pad memory 16 is polled, at least one critical data word is collected by way of buses 18 and 22. Concurrently, time register 98 provides a time word by way of bus 26C, which combines with the critical data word(s) to form a frame of information. Thus, one frame of information is collected during each polling cycle and is applied in bit parallel/word serial format to converter 54 by way of bus 22C as shown in FIG. 2. Concurrently, a frame synchronization word may be provided by the associated computer and stored in the scratch pad memory 16 with other critical information. In an alternative implementation, the frame synchronization word may be provided by controller 52, e.g. by a ROM or a hard wired logic circuit, and applied to converter 54 by way of bus 62 to become part of the frame. Whatever its origin, the frame synchronization word is used to designate the start of each frame of information. To assure its uniqueness, c identity bits are added to each word by converter 54. When the frame synchronization word is loaded into converter 54, controller 52 issues the sync code signal via conductor 129 which forces the identity bits to be ONES. In all other words these bits consist of ZEROS.

A typical frame and its direction of motion in converter 54 is illustrated in FIG. 5. As used herein, the expression "critical information" or "critical information words" includes the time word, all other data words and the frame synchronization word, if any.

In accordance with the principles of the present invention, the time delay memory system is capable of operating in two different modes, specifically a normal mode of operation and a recovery mode. In the normal mode, converter 54, acting under the control of controller 52, performs a parallel-to-serial conversion of all incoming information. As explained above, the converter may comprise a shift register in a preferred embodiment of the invention, whereby successive n-bit words read out in parallel from scratch pad memory 16, from time register 98 and from controller 52 (under the conditions outlined above), are all converted to serial format by loading the converter shift register in parallel and reading it out serially. Within modulator 56, the serial information so derived at the output of converter 54 modulates the carrier signal provided by oscillator 70 via conductor 72 shown in FIG. 4. The modulated carrier signal is amplified by line driver 58 and is subsequently applied, still in series format, to input port 44 of acoustic delay line 40. In addition to amplifying the modulated signal to the level desired at the input port, line driver 58 also performs an impedance matching function which adapts the output impedance of this amplifier to the input impedance of the electro-acoustic transducer which is conventionally used at the input port of the acoustic delay line.

Controller 52 orchestrates the operation of the time delay memory system through the action of the various control signals discussed in connection with FIG. 3. As shown in FIG. 3, the system clock frequency is used directly to provide Bit Clock pulses which operate the converter shift register. By frequency-dividing the applied System Clock pulses in bit counter 32, the controller produces Word Clock pulses via conductor 27 for timing the rate at which words are read into converter 54. The word rate so provided is $1/n+c$ times the bit rate established by the Bit Clock pulses, where n equals the number of data bits and c equals the number of identity bits, if any, added to guarentee a unique frame synchronization word. The Word Clock pulses are further applied to address generator 60 (shown in FIG. 2), which polls scratch pad memory 16 and timer 24 at a fixed word rate during the normal mode of operation of the time delay memory system.

During normal operation, control logic unit 36 provides the aforesaid Shift Control signal to converter 54 via conductor 23. This signal directs the shift register in converter 54 to reject serial inputs from demodulator 50, to accept parallel data inputs from bus 22C and to shift this data in serial format toward the converter output and into modulator 56 upon the occurrence of each Bit Clock pulse. Control logic unit 36 further generates appropriate commands by way of control bus 22A upon receipt of each Word Clock pulse via conductor 27. These commands direct RAM 16, or timer 24, to supply the word requested by address generator 60. Upon system start up, a Clear signal is provided via conductor 29 from unit 36 to reset address generator 60.

All information applied to input port 44 of acoustic delay line 49 propagates at the characteristic drift rate of the acoustic delay line, and it arrives at output port 46 of the delay line after a predetermined delay interval $\Delta t$. The length of the delay line is selected to provide the desired delay interval $\Delta t$, specifically to be equal to or greater than the sum of: (1) the maximum expected duration of the transient condition; (2) the duration of such adverse effects as continue beyond the termination of the transient condition; and (3) the length in serial format of one and preferably two data frames. Item (3) is required because the minimum amount of critical imformation from which destroyed information can be reconstructed in a single information frame. However, two data frames are preferably provided to avoid phase uncertainty, as will be discussed below. Accordingly, the length of the delay line is selected to assure that the number of bits entered into the delay line prior to the onset of the transient condition and still present when the adverse effects produced by the transient conditions have subsided, is preferably equivalent to two complete information frames. While the information in the delay line will generally contain only one complete frame together with portions of the preceding and succeeding frames respectively, such information as is present will have been collected prior to the onset of the transient condition from the scratch pad memory, from the timer and from the controller if the latter generates the frame synchronization word.

From practical experience it is known that the adverse effects may endure as long as 5 msec beyond the termination of the transient condition. Thus, if the transient condition produces a disturbance that causes an overall system power outage, the selected length of the delay line interval will extend from the onset of the transient condition to the termination of the maximum expected power outage interval plus one or two information frames. Such a delay interval also takes into account the possibility that some of the circuits may have become destabilized by the power outage, and $\Delta t$, therefore, extends to the point when all circuits have again become stabilized, if that point occurs after the termination of the power outage. In one embodiment of the invention, a delay interval $\Delta t$ of 7.5 msec was found to be feasible.

Referring to FIG. 2, when the system operates in the normal mode as described above, all information derived at output port 46 of acoustic delay line 40, after being amplified and demodulated by units 48 and 50, respectively, is discarded because it is not accepted by the shift register's serial input of converter 54, which is under control of the Shift Control signal via conductor 23 from controller 52. The recovery mode is initiated when the onset of a transient condition is sensed by recovery circuit 28 (shown in FIG. 1) and a responsive signal is applied to controller 52 via conductor 30. The recovery mode comprises essentially three separate phases:

(a) The delay interval (which occurs in both modes of operation);

(b) The reloading operation during which the critical information is reloaded into the timer and scratch pad memory respectively, in the form in which it originally resided there; and (c) The compensation operation during which the reloaded information is synchronized and updated to compensate for the delay interval.

Referring to FIGS. 6A and 6B, the recovery mode of operation of the system will be more specifically explained. The respective frames of information that were entered into delay line 40 prior to the onset of the transient condition are illustrated by successive frames i-1, i-2 . . . i-7 in FIG. 6A, which shows the status of the delay line at the onset of the transient condition. Frame i-7 is the oldest information frame in the line and frame i-1 is the frame most recently entered. Frame i is shown in the process of entering the delay line through input port 44. As illustrated, only a portion of frame i has actually entered the delay line at the onset of the transient condition. In accordance with the principles of operation of an acoustic delay line, all data is assumed to be drifting to the right in FIG. 6A, at the velocity of the inner surface wave in a fused silica capillary.

As previously explained, the length of the delay line is chosen to assure that, at the time when all adverse effects have subsided, the number of information bits present in the delay line, which were entered prior to the onset of the transient condition, is equal to at least one and preferably two complete information frames. The initiation of the reloading phase of the recovery mode must therefore be preceded by a delay interval which minimally assures that all such effects have in fact subsided.

This is illustrated in FIG. 6B which shows the status of the delay line at the initiation of the reloading operation. At this point in time, frames i-3 to i-7 have advanced beyond output port 46. Frame i-2, which has partially advanced beyond port 46, is incomplete and is therefore no longer useful for recovering information. Frame i, which had only partially entered the delay line at the onset of the transient condition, is likewise present in the delay line as only an incomplete frame. Thus, although the length of the delay line permits the storage of two complete frames collected prior to the onset of the transient condition, frame i-1 is the only complete information frame that is actually stored during the period determined by the onset of the transient condition to the initiation of the reloading operation. All subsequent information that entered the delay line after the onset of the transient condition, including frame i, must be considered as meaningless. This is schematically indicated by the cross-hatching in FIG. 6B.

The situation described above illustrates the general case. Although two complete frames can be accommodated in the delay line, in general only one complete frame and parts of two other frames will be present at the initiation of the reloading operation. Although it is possible to make the system word when the delay line is only one frame length longer than the disturbance, the illustrated embodiment is simpler to implement and therefore preferable.

Upon receipt of the recovery signal via conductor 30, controller 52 ceases to apply Word Clock pulses to address generator 60. In other words, controller 52 stops generating commands for polling scratch pad memory 16 and timer 24. Further, the Shift Control signal applied to data converter 54 is altered such that serial format information received from demodulator 50, which is not accepted by converter 54 during the normal operation of the circuit, is now written into the converter shift register using the Recovered Bit Clock signal in lieu of the now erroneous System Clock signal. Following recognition of the frame synchronization word, this recovered information is sent out of the converter in parallel format by the Word Clock pulses on line 27 and suitable control signals on bus 22a, all of which are derived from the resynchronized System Clock signal. Thus frame i-1, which was read out in serial format from output port 46 and then amplified and demodulated by units 48 and 50, respectively, is now converted to parallel format by converter 54 and appears on information busses 22C and 62.

When frame i-1 is applied to decoder 38 in controller 52 by way of bus 62, the frame synchronization word is recognized and a Recognition signal is generated. The latter signal is applied to control logic unit 36 by way of conductor 31 and causes a Clear signal to be generated, which Clear signal is applied to address generator 60 via conductor 29. The Clear signal has the effect of resetting the address generator by clearing its contents and enabling it to be synchronized to the recovered information. The Recognition signal also is applied to Control Decoder 84 for use in resynchronizing the system clock as explained in connection with FIG. 4.

By the action of timer 24 described above, whereby flip-flop 81 was reset in response to the Recovery signal and subsequently set in response to the application of the Recognition signal, resynchronized System Clock pulses are generated. The pulses are frequency-divided in bit counter 32 such that resynchronized Word Clock pulses are provided and applied to the address generator 60 and control logic unit 36, which results in resynchronized address and control commands being applied to scratch pad memory 16 and timer 24 by way of busses 22A and 22B. This action causes the recovered information words, which now appear in parallel format at the output of converter 54, to be read out at the Word Clock frequency. Since address register 60 was reset to zero, the first word of frame i-1, which is the frame synchronization word, will be reloaded into the zero address of scratch pad memory 16. Subsequent data words of this frame are reloaded into successive locations of memory 16 as the address generator is incremented by the Word Clock pulses.

The reloading operation described above continues until all the data words of the frame have been reloaded into memory 16, as determined by word counter 34. At that point, the control signals issued by controller 52 via bus 22A result in reloading the sole remaining word of frame i-1, i.e. the time word, into time register 98 of timer 24.

The conclusion of the reloading operation is indicated when word counter 34 generates a Frame Clock signal, which is applied to control logic unit 36 via conductor 37. At this time controller 52 reverts to its normal operation. The data words contained in information frame i-1 now again reside in temporary storage in scratch pad memory 16, while the corresponding time word again resides in time register 98 of the timer.

Both the time word and the data words represent time-dependent values which, although they are older by the amount of the delay interval $\Delta t$, are substantially identical to the values that resided there at the onset of the transient condition.

A compensation operation is required to update the words of the reloaded frame to current time. As previously discussed, the critical information, i.e. the time word and the data words which may represent integrals of velocity and acceleration, etc., are all time-dependent and are continuously updated during normal operation. After a disturbance caused by a transient condition, all such information words must be compensated for the period $\Delta t$ during which no updating took place.

The reloaded time word is compensated for age by advancing time register 98 by $\Delta t$. As discussed in connection with the operation of the timer circuit illustrated in FIG. 4, time register 98 essentially constitutes a binary counter which may be advanced by means of multiple clocking, i.e. by running the counter at a multiple of the clock frequency for the controlled period of time. In the embodiment shown and discussed in connection with FIG. 4, that multiple was taken at twice the normal clock frequency. Alternatively, the compensating function may be performed by the CPU under program control.

Once the integrity of the time reference, (i.e. of the time word), is reestablished, the critical data words in scratch pad memory 16 can be compensated for age. As discussed above, these critical data words represent reloaded integrals of various time-dependent values. While a circuit for compensating the critical data words can be implemented by means of hardware logic in similar manner to the compensation circuit of timer 24, the compensating function in this case is preferably carried out by means of a subroutine stored in ROM 12. Essentially, during the first integration cycle following recovery, such a subroutine increases the integration constant dt, used for the normal mode of operation, by the additional data age, $\Delta t$. $\Delta t$ must be carefully determined to include all delays which affect data age. In addition to the delay introduced by delay line 40, $\Delta t$ must include the time delay incurred in the initial polling process as well as that incurred in reloading recovered data into RAM 16 and time register 98 and other recovery operations which may be required before normal computation can be resumed.

The software implementation of compensating the time word and/or the critical data words can be carried out with standard, real time programming techniques capable of progressively updating a value.

Figure 7:
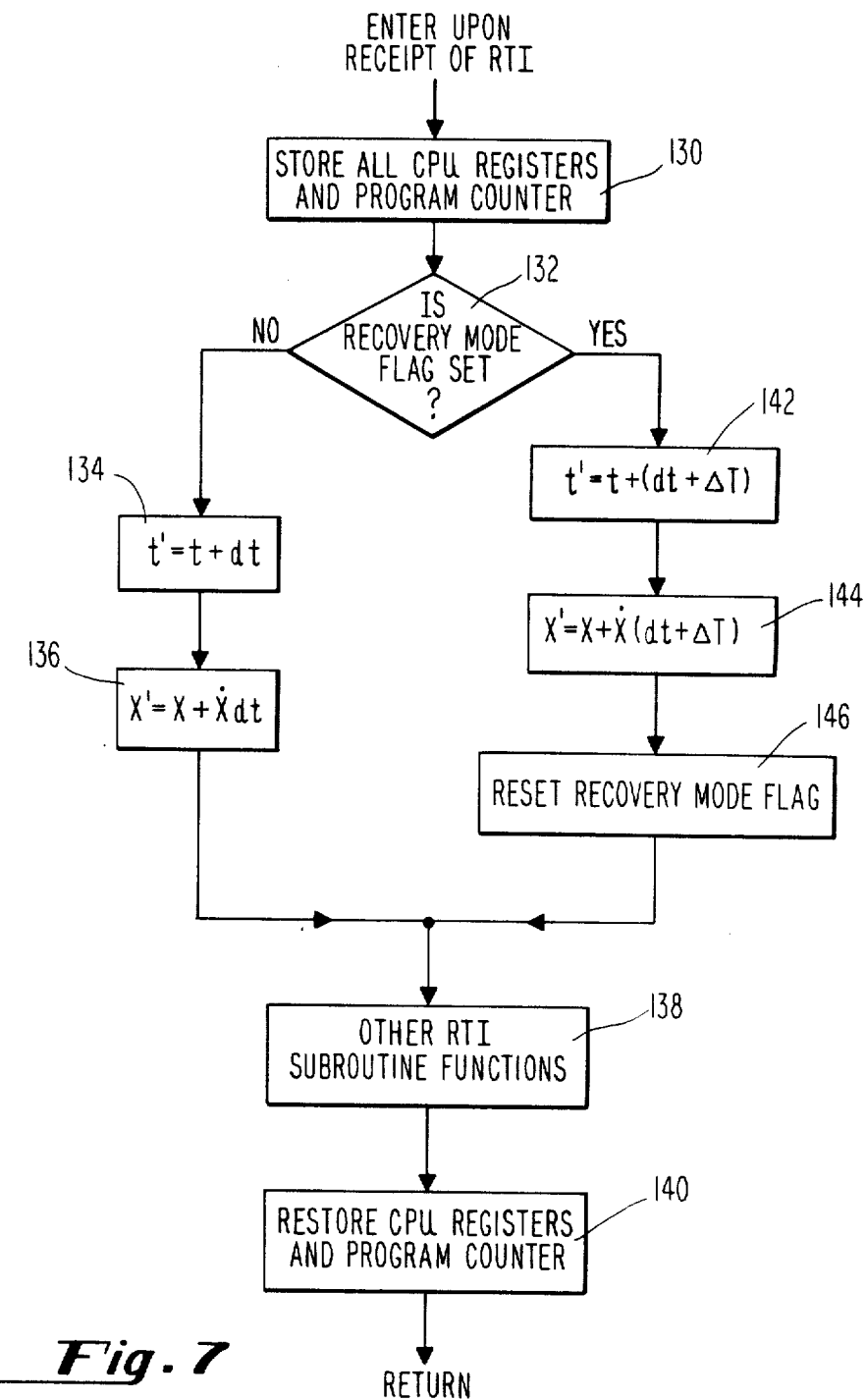
FIG. 7 illustrates an exemplary software implementation in flow diagram form for compensating the time word and the critical data words as a result of the delay interval; and, FIG. 8 illustrates another embodiment of a time delay memory system.

FIG. 7 illustrates a flow diagram which uses a real time interrupt subroutine to compensate both the time word and the critical data words. As shown, upon receipt of the real time interrupt (RTI) command, the contents of all CPU registers and of the program counter are stored. This is indicatd by process block 130 in FIG. 7. Decision block 132 provides two paths, depending on whether or not the recovery mode flag is set. If it is not set, and the system is in its normal mode of operation, the time word is progressively updated with time. To do so, the RTI interval constant dt must be recalled from memory and added to the time word. The procedure is illustrated by the equation shown in block 134:

$$t' = t + dt;$$

where
- t' = the updated time word;
- t = the existing time word; and
- dt = RTI interval.

Following the update of the time word, the critical data words which designate the other integrals, such as velocity and acceleration, etc., are compensated by updating. The update of one such integral is shown and it is designated by the equation in block 136:

$$x' = x + \dot{x}dt;$$

where
- x' = the updateed integral value;
- x = the existing integral value;
- $\dot{x}$ = average slope of x with respect to time over the interval dt; and
- dt = RTI interval.

Block 138 indicates the performance of other RTI subroutine functions, such as the conduct of conditional tests to recognize specific integral values and the issuance of appropriate commands conditional on these integral values, while block 140 indicates the restoration of the contents of the CPU registers and of the program counter. At this point the real time interrupt subroutine is terminated, and the operation is returned to the main program.

If the recovery mode flag is set, the system is operating in the recovery mode in which all compensation for age of the information must further take into account the age of the recovered data. This is indicated in block 142 by the equation:

$$t' = t + (dt + \Delta t).$$

Following the compensation of the time word, the other integrals are compensated as shown by the representative equation in block 144:

$$x' = x + \dot{x}(dt + \Delta t).$$

Having performed the compensation functions for the time word and for all critical data words, and having performed any other recovery functions as may be required by the system, the recovery mode flag is reset as indicated by block 146 and the operations designated by blocks 138 and 140 are performed.

After the reloaded information words have been updated as described above, the recovery mode is terminated and normal system operation resumes. It will be clear that, at this point in time, the time delay memory system has achieved its intended purpose of preserving the information of the scratch pad memory and of the timer respectively. The information contents in both of these units are substantially what they would have been had the transient condition not occurred. Accordingly, the integrity of the reloaded, compensated information is high.

In a preferred embodiment of the invention, acoustic delay line 40 may include a flat spiral of a fused silica capillary, bonded in coil form to a disc-shaped base, or the like. The drift rate, i.e. the propagation velocity of such delay lines, is substantially constant provided the temperature of the delay line material remains constant or varies only by a negligible amount. While this is true for many applications, in some instances a significant temperature variation of the delay line material will occur due to changes of the ambient temperature, or due to energy transferred to the fused silica material of the delay line by a change of the immediate delay line environment brought about by the transient condition. Where the delay interval $\Delta t$ encountered between the input and output ports must be known precisely, the delay can be measured and recorded either immediately prior to use and/or periodically during use of the delay line. Alternatively, estimates of the temperature variation can be made and the delay interval $\Delta t$ can be compensated by means of software. Such situations also can be dealt with by measuring the delay interval after the termination of the recovery mode of operation. By using appropriate software, the new value may be used to fine-tune the dated information and thus, the compensation of the time word and of the data words.

Except for the factors mentioned above, the drift rate of the delay line, as well as the information stored in the delay line, are substantially immune to the adverse effects of the aforesaid transient condition. In accordance with the principles of the present invention, this is accomplished by maintaining the critical information from which the data and the time word are reconstructed, e.g. frame i-1, entirely within the delay line between the onset of the transient condition and the point in time when the adverse effects have subsided. As a consequence, errors of the type caused by inadvertent overwriting by the CPU, or by stray currents within the read and write circuits of the scratch pad memory, are eliminated and the critical information is preserved with a high degree of integrity.

Figure 8:
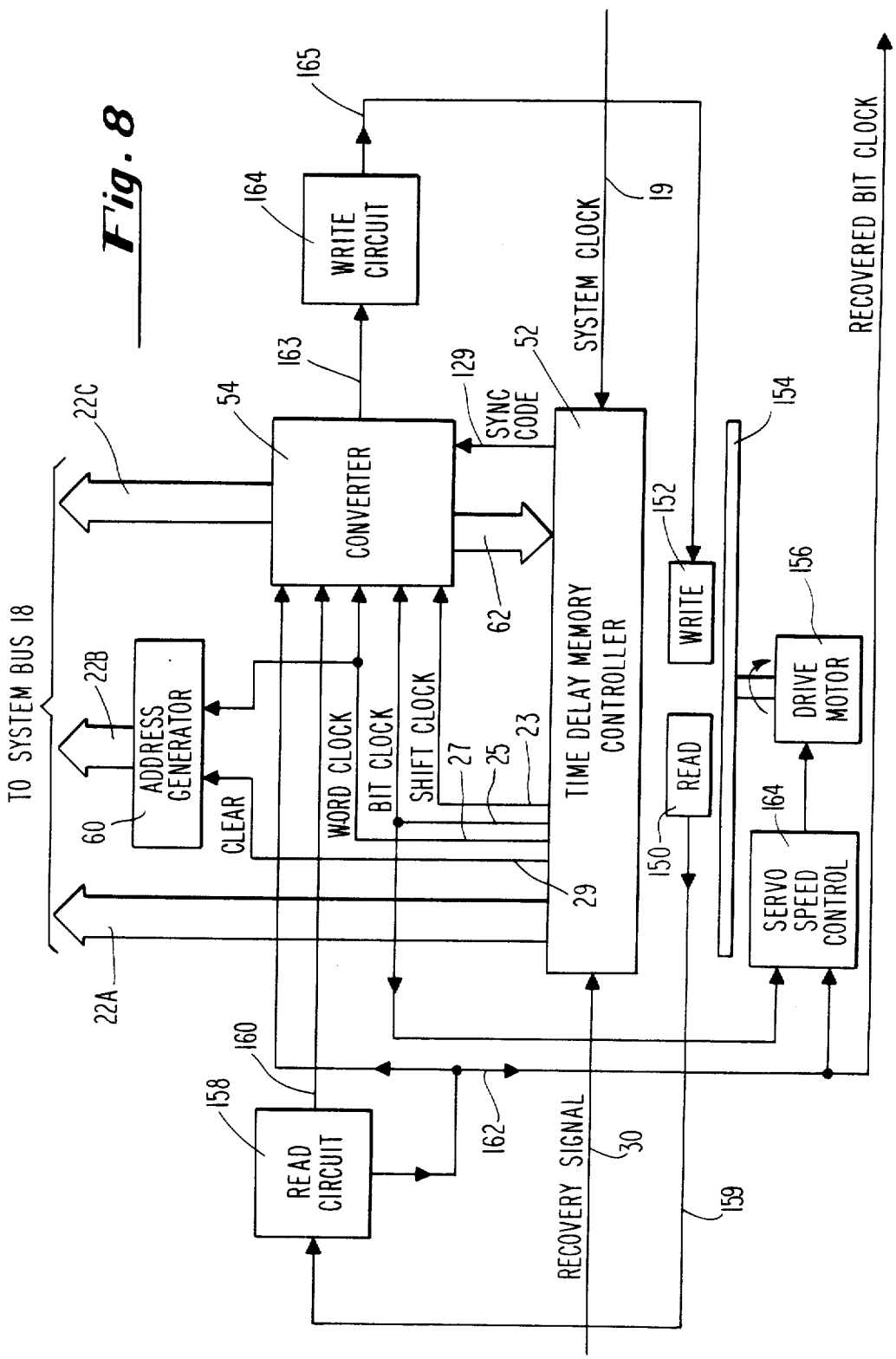

In an alternative embodiment of the present invention, a dynamic magnetic storage device is used wherein a magnetic storage medium, such as a magnetic disc or a closed loop magnetic tape, moves past a pair of spaced magnetic heads and the delay interval is determined by precisely maintaining a constant velocity of the magnetic medium between these heads. In such a time delay memory system, ambient temperature variations and the like do not affect the delay interval. FIG. 8 illustrates a time delay memory system constructed in accordance with these principles, wherein applicable reference numerals have been carried forward. As shown, the input and output ports of the system illustrated in FIG. 8 are constituted by magnetic read and write heads 150 and 152 respectively, which are mutually spaced along a common track of the magnetic medium, in the direction of movement thereof. A disk 154 constitutes the magnetic storage medium and it is driven in the direction of the arrow by a drive motor 156. The signal that is read out by read head 150 is applied to a read circuit 158 via a conductor 159, and read circuit 158 has an output coupled to converter 54 via a conductor 160. A second read circuit output is applied via a conductor 162 to a servo speed control circuit 164 and to converter 54 and also provides the Recovered Bit clock pulses, as shown. Servo speed control circuit 164 receives a Bit Clock signal from controller 52 via conductor 25. An output of converter 54 is coupled via a conductor 163 to a write circuit 164, whose output in turn is coupled via a conductor 165 to write head 152. The remainder of the system shown in FIG. 8 is similar to that illustrated in FIG. 2 and therefore, requires no further discussion.

In operation, servo speed control circuit 164 regulates the speed of rotation of drive motor 156 to maintain the rotational speed of disk 154 substantially constant. As shown, the servo circuit uses the Bit Clock signal as a speed reference to which a conventional tachometer feedback signal can be compared.

A more precise feedback signal can be provided by monitoring the transit time of a bit of data through the time delay interval by comparing the Recovered Bit Clock signal, with the Bit Clock signal and servo controlling the motor speed to null the error difference signal. In such a system, any phase ambiguity concerning the comparison of respective Bit Clock pulses with the Recovered Bit Clock pulses can be eliminated by initially operating the system in the recovery mode and obtaining the frame synchronization word Recognition signal via conductor 31 for comparison with the Frame Clock. Such a procedure will provide an initial, non-ambiguous measure of the delay interval Δt to establish phase synchronization and thereafter, the Bit Clock pulses are used merely to maintain synchronization.

In a variant of the servo control system illustrated in FIG. 8, the motor speed is only coarsely controlled, or not controlled at all. Delay time is measured once per frame and is used only to compensate for the age of the time word in the recovery mode. Such a scheme is readily implemented when updating is performed by the CPU. The measured time delay, expressed as the difference from some predetermined minimum value, would then be provided in parallel, digital format by the CPU. This can be accomplished by counting Bit Clock pulses, starting with receipt of a reference time delay pulse (obtained by frequency dividing the Frame Clock), and ending with receipt of the recovered frame synchronization word Recognition signal. This count can then be written into the magnetic disk by the controller as the ith word in the frame. Subsequently, upon reloading the scratch pad memory with a recovered fame, both aged time data and data age (i.e. the current delay interval) will exist as words in the scratch pad memory. The sum of these two values and the nominal delay interval, i.e. a built in constant, provides a very accurate estimate of the correct time.

The inertia of the apparatus must be such that the velocity of the disk is maintained substantially constant during the recovery mode, even if the system must operate without power, or with fluctuating power as a result of the transient effects. Further, the information stored in the disk is nonvolatile, i.e. it is retained even when the system is shut down.

While the preferred implementation of the invention discussed above employs a conventional binary counter in time register 98 of the timer, thre are other counting techniques readily available. For example, a shift code counter may be employed, using a pseudo-random code. Alternatively, a recirculating counter may be used in which one count is added to the code each time the latter is circulated through a shift register.

The ability of the present invention to provide a constant, predictable delay interval between its input and output ports forms the underlying basis for accurately compensating the reloaded information for the age of such information. Hence, the integrity of the data and of the time reference are preserved in all of the embodiments discussed above, regardless of the adverse effects produced by the transient condition.

As already mentioned, data is written before the onset of the adverse transient condition and it is read out after the adverse effects have subsided. Hence, the critical information is securely within the secondary storage device at all times when transient effects are present, and at no time is it subject to inadvertant over-wiring by false inputs, however originated. Thus, unlike the requirements that attend the use of plated wire memories or core memories, no precisely balanced circuits or high speed clamping circuits triggered by the transient condition are required with the present invention in order to avoid data upset. All that is necessary is to sense the transient condition in order to initiate the recovery mode. Because the timing of the event is not critical, no costly transient response analysis of the read and write circuitry is required, as may be the case where plated wire memories are used.

A further advantage of the present invention derives from the ability to use a conventional semiconductor scratch pad RAM and a conventional semiconductor counter in the timer. Since the critical information, extracted by periodically polling the scratch pad memory and the timer, is substantially immune to the adverse effects of the transient condition once the information is stored in the secondary data storage device, a data processing system which uses the present invention may operate at high speeds, limited only by conventional RAM access time. Likewise, the counter in the timer may operate at a high "least count" frequency to provide improved resolution. In such a situation the relatively slow data propagation rate through the delay line does not normally limit the data processing speed, even though information is processed through the line serially. This is due to the fact that the critical data in the scrath pad memory constitutes only a fraction of the total data stored therein. Since only critical data need be stored in secondary storage, the overall data processing speed is not materially affected.

From the foregoing discussion of preferred apparatus and method for implementing the present invention, it will be clear that the invention lends itself to numerous changes, modifications, substitutions and equivalents, all of which will now be apparent to those skilled in the art. Accordingly, it is intended that the invention be limited only by the scope of the appended claims.

What I claim as new and desire to secure by Letters Patent of the United States is:

1. Apparatus for preserving time-dependent, progressively updated, critical information from destruction by the adverse effects produced by an externally originated transient condition, comprising:

(a) a first storage means for holding said critical information;

(b) means for collecting said critical information from said first storage means;

(c) a second storage means substantially immune to said adverse effects;

(d) means for entering said collected critical information in the form of successive critical information frames into said second storage means, said critical information including at least one complete frame comprised of progressively updated critical data words and a progressively updated time word representative of the elapsed time starting from a predetermined reference point, said frame further including information adapted to provide a recovered bit clock signal;

(e) said first storage means comprising a scratch pad memory and a timer adapted to store said critical data words and said updated time words respectively, said timer including a clock adapted to generate clock pulses and a counter for storing and progressively updating said time word by advancing said counter in synchronism with said clock pulses;

(f) said collecting means including means for providing successive readouts from said scratch pad memory and said timer, each of said readouts being adapted to provide at least one of said critical information frames comprising said critical data words and said time word;

(g) said second storage means including means for imposing a predetermined delay interval extending from the entry of said critical information therein to its retrieval therefrom, said delay interval having a duration selected to assure the presence, in said second storage means, upon the termination of the adverse effects, of said critical information that was entered before the onset of said transient condition;

(h) means for discarding said critical information retrieved from said second storage means during a normal mode of operation of said apparatus; and (i) means for retrieving and reloading said critical information from said second storage means into said first storage means after the termination of said adverse effects during a recovery mode of operation of said apparatus initiated by the onset of said transient condition, said retrieving and reloading means further comprising means for resynchronizing said clock with said recovered bit clock signal and for simultaneously reloading said time word into said counter during said recovery mode of operation.

2. Apparatus according to claim 1, further including means for compensating said reloaded time word for its age by advancing said counter at an accelerated rate for a limited period during the recovery mode of operation such that said counter is advanced by an amount of time equal to said predetermined delay interval.

3. Apparatus according to claim 2, wherein the accelerated rate for advancing said counter constitutes a multiple of the frequency of said clock pulses.

4. Apparatus according to claim 3, wherein said counter is advanced at twice the frequency of said clock pulses.

5. Apparatus according to claim 2, further including means responsive to the compensated time word residing in said counter for compensating time-dependent ones of said reloaded critical data words in said first storage means during the recovery mode of operation of said apparatus.

6. Apparatus according to claim 2, wherein each frame of said critical information includes a unique frame synchronization word adapted to designate the start of each of said frames.

7. Apparatus according to claim 6, wherein said retrieving and reloading means further comprises:

(a) means for addressing said scrath pad memory and said timer respectively; and (b) means for synchronizing said addressing means upon recognition of said unique frame synchronization word to effect the reloading of the respective critical data words and time word associated therewith during the recovery mode of operation.

8. Apparatus for preserving the integrity of time-dependent, periodically performed, critical calculations from destruction by the adverse effects produced by an externally originated transient condition of approximately known maximum duration, comprising:

(a) a first storage means for holding critical information, said critical information including a time reference and time-dependent values;

(b) means for collecting said critical information from said first storage means;

(c) a second storage means substantially immune to said adverse effects and including an input and an output, said second storage means being adapted to accept said critical information at said input and to reproduce said critical information at said output after a predetermined delay interval;

(d) means for entering said collected critical information in the form of successive critical information frames into said second storage means;

(e) sensing means responsive to the onset of a transient condition to switch said apparatus to a recovery mode;

(f) means for loading said critical information from said second storage means into said first storage means after termination of said adverse effects during said recovery mode; and (g) means for compensating the time reference and the time-dependent values of said critical information for said predetermined delay interval imposed by said second storage means.

9. Apparatus according to claim 8, wherein said second storage means comprises an acoustic delay line consisting of a fused silica capillary.

10. Apparatus according to claim 8, wherein said second storage means comprises a dynamic magnetic storage device.

* * * * *